United States Patent [19]

Yazawa et al.

[11] Patent Number: 4,843,471

[45] Date of Patent: Jun. 27, 1989

[54] VIDEO IMAGE STORAGE DEVICE

[75] Inventors: Yoshiyuki Yazawa; Hirofumi Ohnishi; Taizo Akimoto, all of Kanagawa; Susumu Washizu; Tsuyoshi Shoji, both of Tokyo, all of Japan

[73] Assignee: Fuji Photo Equipment Co., Ltd., Kanagawa, Japan

[21] Appl. No.: 131,682

[22] Filed: Dec. 11, 1987

[30] Foreign Application Priority Data

Dec. 11, 1986 [JP] Japan .................. 61-295634

[51] Int. Cl.⁴ .............................................. H04N 5/14
[52] U.S. Cl. ..................................... 358/160; 358/148
[58] Field of Search ................... 358/148, 149, 160

[56] References Cited

U.S. PATENT DOCUMENTS

| | | | |
|---|---|---|---|
| 4,099,205 | 7/1978 | Hattori et al. | 358/149 |
| 4,134,131 | 1/1979 | Hopkins, Jr. | 358/149 |
| 4,536,795 | 8/1985 | Hirota et al. | 358/160 |
| 4,587,558 | 5/1986 | Sugiyama et al. | 358/160 |
| 4,673,981 | 6/1987 | Lippman et al. | 358/160 |
| 4,680,630 | 7/1987 | Field | 358/160 |
| 4,701,800 | 10/1987 | Akimoto et al. | 358/244 |
| 4,703,356 | 10/1987 | Herzog et al. | 358/160 |
| 4,709,268 | 11/1987 | Akimoto et al. | 358/150 |

FOREIGN PATENT DOCUMENTS

| | | |
|---|---|---|
| 218406 | 4/1987 | European Pat. Off. . |
| 57-20074 | 2/1982 | Japan . |
| 57-180282 | 11/1982 | Japan . |
| 62-77770 | 4/1987 | Japan . |

*Primary Examiner*—James J. Groody
*Assistant Examiner*—Michael D. Parker
*Attorney, Agent, or Firm*—Sughrue, Mion, Zinn, Macpeak & Seas

[57] ABSTRACT

A video image storage device comprises a signal input means capable of analog-to-digital conversion of input video signals including various types of scanning lines such as different numbers of scanning lines, a frame memory means capable of memorizing image signals and signal output means. The video image storage device further comprises an input signal generating means, an output signal generating means and a frame memory control means. The input signal generating means comprises a N multiplying circuit capable of N multiplying horizontal synchronizing pulses. The number of N in a dividing circuit can be arbitrarily determined by the relation between effective image period and blanking period, and thus the video image storage device can store input video signals having different scanning line numbers which depend upon the types of diagnostic modalities.

14 Claims, 6 Drawing Sheets

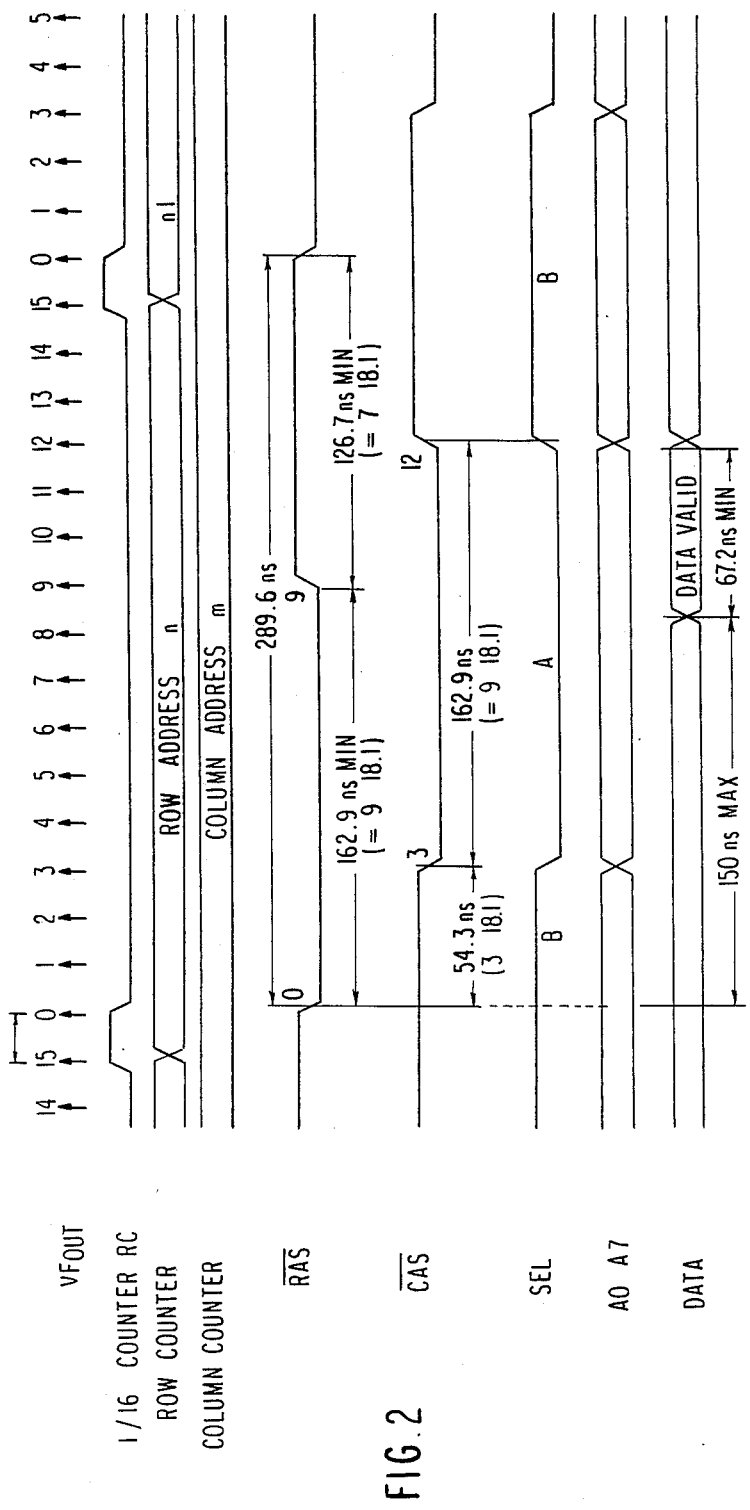

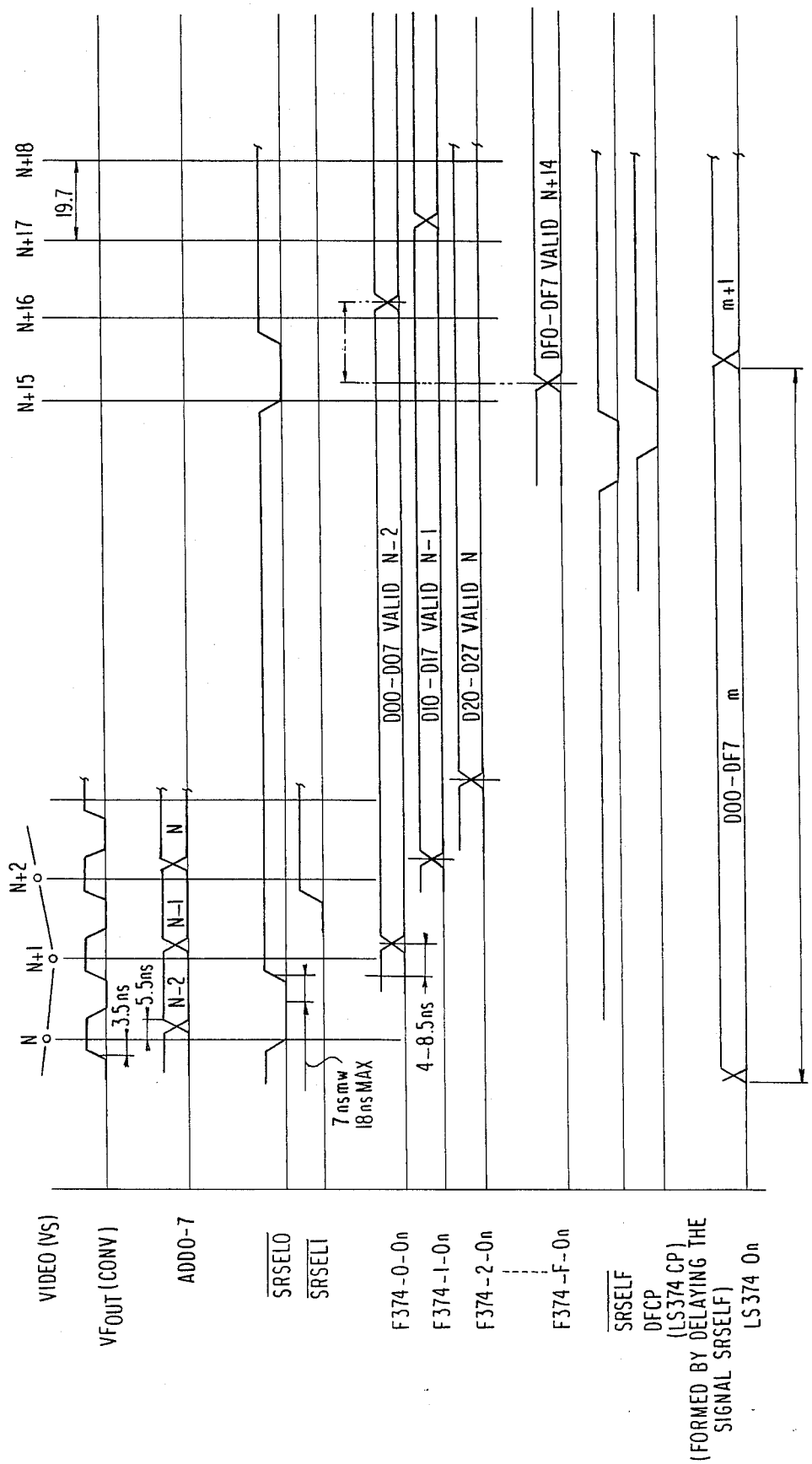

VIDEO IMAGE STORAGE DEVICE

BACKGROUND OF THE INVENTION

The present invention relates to a video image storage device, and more particularly to a video image storage device capable of memorizing digital signals obtained by converting input video signals into the digital signals by means of an A/D converter and capable of outputting the stored video signals in the device at the time when needed. The video image storage device can be used for signal sources from various kinds of image recording apparatus such as medical video imaging cameras, laser printers, thermal printers and ink jet printers, and also can be used for signal sources of files of the picture archiving and communication system (PACS) which is a simple diagnostic system including analog signal sources therein. Further, the video image storage device can be used as an image storage device for an X-ray television and cinematographic system, an image buffer and a scanning converter by way of its image memorizing function.

In a conventional manner, video signals having a certain line numbers/frame are stored in a frame memory of a storage device corresponding to the line numbers/frame by converting the video signals into digital signals. In case of interlace scanning, the term "frame" means a complete image consisting of two fields, and the term "frame memory" means a memory which can memorize images in the form of digital signals. The digital signals stored in the frame memory can be converted into analog video signals, when determined necessary, and also can be output in the form of analog video signals having the same scanning line numbers/frame as those of the input video signals. Accordingly, when the frame memory memorizes input video signals having the scanning line numbers/frame of 525 lines/frame, for example, the video signals having the same line numbers/frame are output. In the same manner, when the frame memory memorizes input video signals having the line numbers of 1024 lines/frame, the video signals having the same scanning line numbers as those of the input video signals are output from the frame memory. After the video images are stored in the frame memory, image processing such as magnification of screen images by adding raster lines between original raster lines or reduction of screen images by reducing original rester lines, or changes of aspect ratio of screen images can be made by use of a microcomputer installed outside the image storage device or a control circuit in the image storage device. Raster line erasure by adding raster lines between original raster lines can be made by use of the linear vertical shift method, the average vertical shift method and the like. Contrast control of the screen images can also be made when it is needed and thus, screen images having high definition can be obtained.

The aforementioned conventional video image storage devices are used for various types of diagnostic modalities having different scanning line numbers/frame to make video screen images. In general, scanning line numbers/frame are in the range from 500 to 2000 lines/frame. In such medical diagnostic modalities, CT, DF, US, RI, MRI and X-ray television by the use of image intensifier have been known. In recent years, computed radiographic (CR) system, which is one of the digital radiographic systems which has been developed. The CT stands for computer tomography which uses tomographic apparatus including a computer and can detect minute amount of differences among X-ray absorptive coefficients at each part of cross-sectional plan of human brain, for instance. The DF, US RI and MRI stand for digital fluorography, ultrasonography, radioisotopic imaging and magnetic resonance imaging, respectively.

In the above medical diagnostic modal systems, a plurality of image storage devices capable of storing video signals corresponding to scanning line numbers/frame intrinsic to the modality of diagnostic apparatus is needed for the purpose of memorizing the video signals from such apparatus. Therefore, for storing image signals, each diagnostic apparatus must have an independent video image storage device that causes increased cost and space for installation.

OBJECTS OF THE PRESENT INVENTION

A primary object of the present invention is to provide a new and improved video image storage device capable of storing input video signals which may have any one of various types of scanning lines and capable of outputting signals in the form of video signals having predetermined types of scanning lines, and also capable of outputting signals in the form of digital signals.

Another object of the present invention is to provide a new and improved video image storage device capable of storing input video signals having various scanning line numbers/frame corresponding to those of the diagnostic systems and capable of output video signals having predetermined scanning line numbers/frame.

Another object of the present invention is to provide a new and improved video image storage device involving digital circuitry for reducing manufacturing and maintenance costs.

Another object of the present invention is to provide a video image storage device for making hard copies by the use of medical video imaging cameras, laser printers, thermal printers, ink jet printers and the like.

Still another object of the present invention is to provide a video image storage device which is used as an input signal source for the picture archiving and communication system (PACS).

Other objects of the present invention will appear hereinafter.

SUMMARY OF THE INVENTION

The above and other objects, features and advantages of the present invention are accomplished by a video image storage device comprising an input means capable of converting input analog video image signals having various types of scanning line numbers/frame into digital image signals, a frame memory for memorizing said digital image signals, a signal output means for outputting said memorized digital signals in the form of analog video signals by the use of a digital-to-analog converter, or outputting said memorized digital signals in the form of digital signals, an input timing signal generating means for producing sampling clock signals synchronized with horizontal synchronizing signals in said input video signals, an output timing signal generating means for outputting said memorized image signals in the frame memory by supplying timing signals to said signal output means and a frame memory control means which controls signal memorizing function of said image signals from said input means to said frame memory in accordance with signals from the input timing signals generating means and controls signal outputting function from the frame memory to the output means in accordance with signals from the output timing signal generating means.

DESCRIPTION OF THE DRAWINGS

FIG. 2 is a display time chart according to an embodiment of the present invention;

FIG. 3 is a time chart of image input means according to an embodiment of the present invention;

FIG. 4 is an example of image signals according to the present invention;

DESCRIPTION OF THE PREFERRED EMBODIMENT

Figure 9:
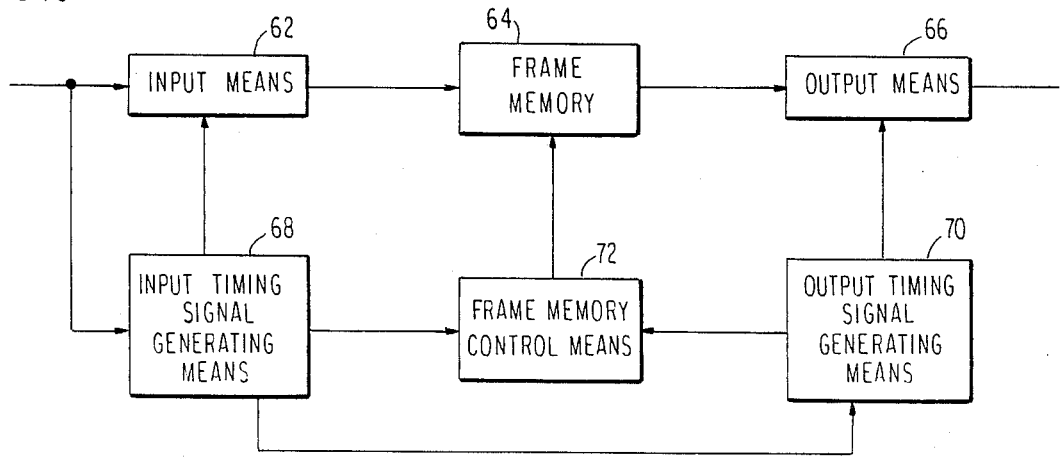
FIG. 9 is a schematic block diagram of a video image storage device according to the present invention.

As shown in FIG. 9, a video image storage device of the present invention comprises an input means 62 which converts input video signals having various types of scanning lines into digital signals, a frame memory 64 which memorizes the converted digital signals, an output means 66 which outputs signals in the form of analog image signals by converting said digital signals memorized in the frame memory 64 into analog signals when determined necessary, or output signals in the form of digital image signals memorized in the frame memory 64, an input timing signal generating means 68 which generates sampling clock signals synchronized with the horizontal synchronizing pulses of the input video signals, an output timing signal generating means 70 which outputs the image signals memorized in the frame memory 64 by supplying signals to the output means 66 and a frame memory control means 72 which controls signal memorizing function of the image signals from the input means 62 to the frame memory 64 in accordance with signals from the input timing signal generating means 68 and controls the output signals from the frame memory 64 to the signal output means 66 in accordance with the signals from the output timing signal generating means 70.

The various aforementioned types of scanning lines include scanning lines having different scanning line numbers/frame, scanning lines containing equalizing pulses, scanning lines without equalizing pulses, interlace scanning lines and non-interlace scanning lines and scanning lines having different ranges of image areas during horizontal scanning period in a single line.

When video image signals are input into the input means 62, the image signals converted into digital signals by analog-to-digital conversion are supplied to the frame memory 64 and at the same time, the video image signals are supplied to the input timing signal generating means 68 so as to synchronize with sampling clock signals. The sampling clock signals are supplied to the frame memory control means 72, the output timing signal generating means 70 and the input means 62. The sampling clock signals act as system clock signals of the device in such manner that the memorizing function of the image signals supplied to the frame memory 64 is controlled for each scanning line and the sampling clock signals cause output timing signals to the output timing signal generating means 70.

For instance, a phase locked loop (PLL) as an N multiplying circuit can be used for the input timing signal generating means 68. The PLL is provided with a phase comparator, and a voltage controlled oscillator (VCO) to which output signals of the phase comparator are supplied via a low-pass filter (LPF). The VCO oscillates the sampling clock signals in accordance with voltage and the sampling clock signals are fed back to the phase comparator by multiplying using a frequency dividing circuit and the phase of the feedback sampling clock signals is compared with the phase of the horizontal sychronizing pulses to synchronize them and the synchronized pulses are supplied to the frame memory control means 72. Thus, the image signals are memorized in the frame memory in sequence, by each scanning line.

The image signals memorized in the frame memory 64 are output timing by the signals generated by the output signal generating means via the frame memory control means. In the meantime, the signals from the output timing signal generating means are also supplied to the output means 66. In case the output means 66 includes is an external memory device and the like, signals memorized in such device is introduced into the image storage device and subsequently, the signals are output as image signals by digital-to-analog conversion, or may be output as digital image signals.

In the input timing signal generating means, the frequency of the sampling clock signals generated by the VCO are multiplied by N by means of a 1/N counter and the multiplied signals are synchronized with horizontal synchronizing pulse signals (H.D.) by the use of the phase comparator. That is, the periods of the sampling clock signals which are output from the voltage controlled oscillator can be arbitrarily changed by setting the 1/N counter. The image periods necessary for each scanning line can be memorized in the frame memory by sampling the image signals by the use of the sampling clock signals in accordance with scanning line numbers of devices to be connected to the output means. The periods of the sampling clock signals may be automatically controlled by use of a microcomputer so as to correspond to a display means connected to the output means or may be manually controlled by viewing images displayed on the display screen connected to the output means.

To determine desired periods of the sampling clock signals in one line of image signals being sampled, the following equation can be used:

$$N = A + B \tag{1}$$

where N is scanning clock pulse numbers in one horizontal scanning line, A is clock pulse numbers in desired image area and B is clock pulse numners in non-image area. The input video signals having various scanning line numbers can be memorized in the frame memory by synchronizing with the sampling clock pulses according to the above equation (1) and the memorized image signals can be output in the form of video signals having desired scanning line numbers. Accordingly, it is unnecessary to change display means due to the variety of the scanning line numbers of the input video signals.

In another way, the clock pulse number N in one scanning line can be obtained by the following equation;

$$N = [Th/Ts] \quad (2)$$

where brackets are Gaus symbols to make N an integer, N is scanning clock pulse numbers in one horizontal scanning line, Th is oscillating periods of horizontal synchronizing pulses and Ts is oscillating periods of sampling clock signals of input video signals from signals souries. By the above sampling, problems such as aliasing, beat of sampling images and insufficient definition at the edges of fine characters caused by the difference of periods between the input sampling periods in digital image signals and the sampling periods by the A/D converter are solved and in addition, images having good image characteristics can be stored without any loss of definition of sampling images.

Figure 1:
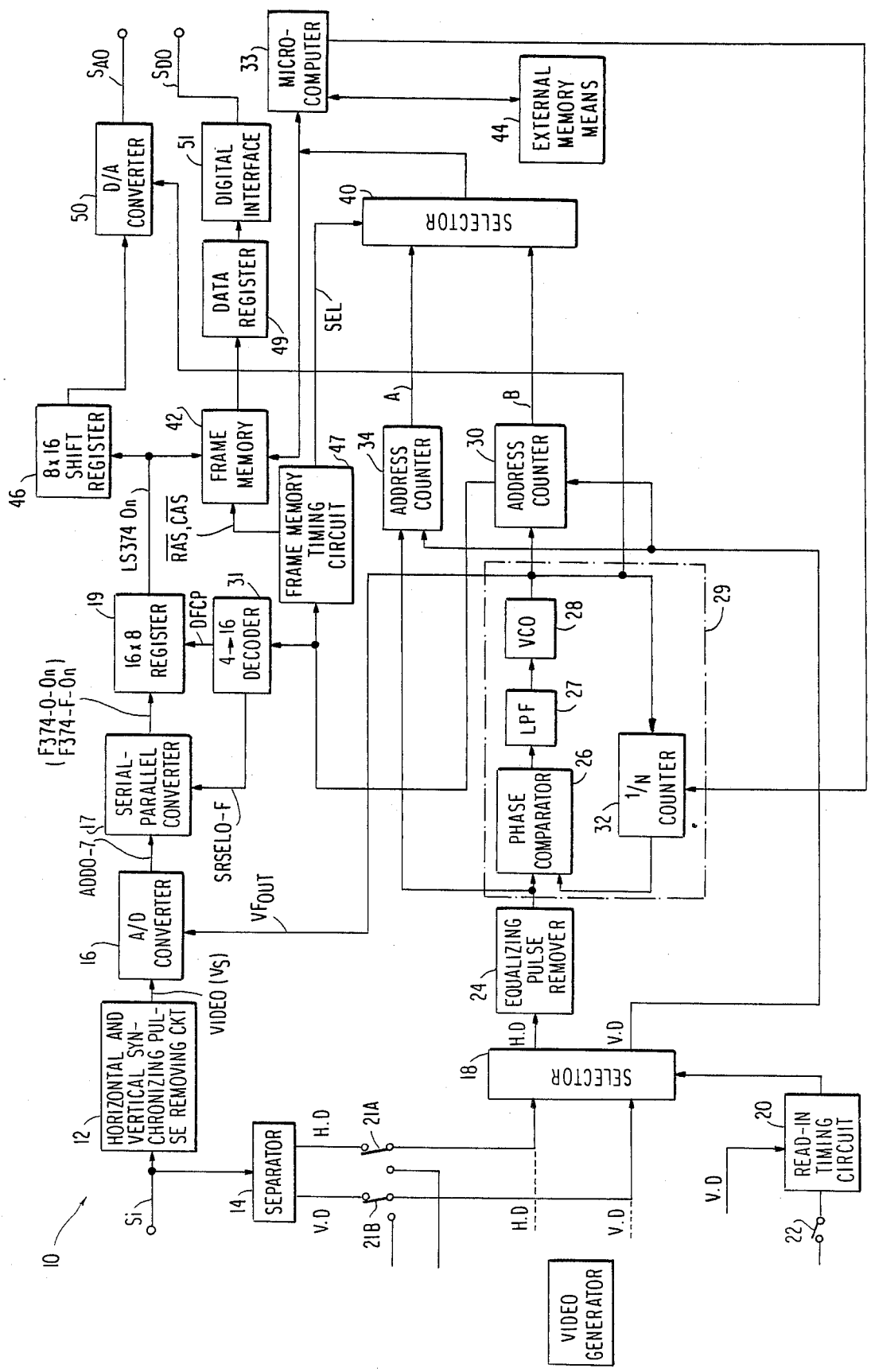
FIG. 1 is a block diagram of a video image storage device according to a first embodiment of the present invention.

FIG. 1 shows a block diagram of a first embodiment of a video image storage device 10 according to the present invention.

Input video signals Si are supplied to both a horizontal and vertical synchronizing signal removing circuit 12 and a separator 14. The output signals VIDEO (Vs) from the horizontal and vertical synchronizing signal removing circuit 12 are supplied to an analog-to-digital (A/D) converter 16 after the horizontal and vertical synchronizing pulses are removed. The output signals (ADDO~7) from the A/D converter are supplied to a serial-parallel converter 17 and the output signals therefrom (F374-0-On and F374-F-On) are supplied to a register 19 and the output signals (LS374-On) from the register 19 are memorized in the frame memory 42 so as to meet the write cycle timing of the frame memory 42. In the present embodiment of the invention, the capacity of the frame memory 42 is 1024×1024×8 bits and can memorize up to 1024 scanning lines/frame. In case the scanning lines exceed 1024/frame, the frame memory 42 may not memorize all the scanning lines, but there are no limitations with regard to the number of scanning lines.

The input video signals are divided into horizontal synchronizing pulse signals (H.D.) and vertical synchronizing pulse signals (V.D.) by the separator 14 and each signal is supplied to a selector 18. H.D. and V.D. signals other than the H.D. and V.D. in the input video signals Si may be supplied to the selector 18 by means of switches 21A and 21B. In addition, H.D. and V.D. signals can be supplied to the selector 18 from a video generator which can be used in the process of image reproduction and also can output video signals having desired scanning line numbers. Output signals from a read-in timing circuit 20 may also be supplied to the selector 18, and by connecting a read-in timing switch 22, read-in timing signals can be output from the read-in timing circuit 20 in synchronizing with V.D. signals.

The H.D. output signals from the selector 18 are supplied to an equalizing pulse removing circuit 24 and the signals from the equalizing pulses removing circuit 24 are output to the voltage control oscillator 28 via a phase comparator 26 and a low-pass filter (LPF) 27. The output signals (VFout) from the voltage control oscillator 28 are output to an address counter 30, the A/D converter 16 and a digital-to-analog (D/A) converter 50. Output signals from the address counter 30 are supplied to a decoder 31 and the signals are converted from 4 bits to 16 bits by the decoder 31 and the converted signals (SRSELO-SRSELF) are supplied to the serial parallel converter 17. The decoder 31 outputs signals DFCP to a register 19 at the timing slightly later than the output of signals SRSELF so that memory timing is matched and 128 bits signals LS374 On from the register 19 are memorized eight times every scanning line in a frame memory 42.

The output signals from the voltage control oscillator 28 are supplied to a frame memory timing circuit 47 and the output signals $\overline{RAS}$ and $\overline{CAS}$ from the frame memory timing circuit 47 are supplied to the frame memory 42 and the output signals SEL from the frame memory timing circuit 47 are also supplied to a selector 40. The clock pulses from the voltage control oscillator 28 are fed back to the phase comparator 26 through a 1/N counter 32. Thus, the phase comparator 26, the low-pass filter 27, the voltage control oscillator 28 and the 1/N counter form a PLL circuit. The 1/N counter 32 divides the clock pulses oscillated by the voltage control oscillator 28 into the same periods as those of H.D. signals and this function is controlled by a microcomputer 33. Accordingly, in case the clock pulse numbers of sampling clock signals in desired image periods corresponding to output images is 1024, the N is obtained by adding the clock pulse numbers B of unnecessary areas (blanking areas) to 1024, i.e., N=1024+B.

The V.D. signals which are output from the selector 18 are supplied to an address counter 30 via a backporch and frontporch setting circuit (not shown) and also to an address counter 34. Thus, the boundary of each image can be detected. The output signals A from the address counter 30 and the output signals B from the address counter 30 are supplied to a selector 40. The output signals from the selector 40 are supplied to both the frame memory 42 and the microcomputer 33.

The digital signals from the frame memory 42 are output to a D/A converter 50 via a shift register 46 and analog video signals SAO is output from the D/A converter 50.

In the mean time, signals $S_{DO}$ which are digital signals, may be output from a digital interface 51 via a data register 49 to which signals from the frame memory 42 are supplied.

Signal output devices to which signals $S_{AO}$ and $S_{DO}$ are supplied may be, for instance, a laser printer for medical uses, a picture archiving and communication system(PACS), a thermal printer, a video screen image recording camera (a multi-format imaging camera), an X-ray television system, an image display unit for signal transmission in a hospital and the like.

According to the time charts as described in FIGS. 2 and 3, an operation of the video image storage device of the present invention will be set forth hereinafter.

FIGS. 2 and 3 show time charts of each signal according to FIG. 1. As shown in FIGS. 2 and 3, the output signals VFout from the voltage control oscillator 28 are the basic clock signals of the system. FIG. 2 shows the timing of read-out operation from the frame memory in which memory cycle timing is shown in case the value of line address counter is m and the value of row address counter is n. Row address select signal (RAS), column address select signal (CAS) and address select signal (SEL) are timely output so as to match with cycle time of dynamic RAM used as the frame memory. The RAS signal, in this instance, is output at the positive edge of the initial VFout signals, and the CAS signal is output at the third positive edge of the VFout. That is, the CAS signal is output at 54.3ns later than the time of the output of the RAS signal. The SEL signal and the CAS signal are output at the same time so that the address signals A0 to A7 are switched to column signals from row signals. In the present example, read-out data become effective at the time of 150ns later than the negative edge of the RAS signal.

FIG. 3 shows a time chart where the write timing of the A/D converted signals into the frame memory is described. The image signals at each clock signal of VFout signals are sampled such as N, N+1, N+2, ..., and the A/D converted output signals ADD0-ADD7 are obtained at two clocks later. The A/D converted signals 0–7 are latched by one of 16 D-flip-flops (F374) in accordance with signals SRSELn. Thus, all data of 16 D-flip-flops (F374) become effective at the time of N+15 as shown in FIG. 3 and these data are latched in the 16 D-flip-flops (F374). The writing operation of the image data latched in the LS374 into the frame memory is similar to the above reading operation and therefore, detailed explanation in this regard will be omitted.

When video signals Si are input to the device, only image signals as shown VIDEO (Vs) are supplied to the A/D converter 16 by means of the horizontal and vertical synchronizing signal removing circuit 12. The A/D converter 16 converts, at realtime, analog signals into digital signals according to the VFout signals from the 1/N counter and outputs the signals ADD0~7 to the serial parallel converter 17. The timing of the output signals VFout is controlled by the PLL circuit, that is, the video signals Si are divided into H.D. signals and V.D. signals by means of the separator 14 and these signals are introduced into the selector 18. The output timing of the V.D. signals from the selector 18 can be timed by means of a read-in timing circuit 20 by turning on a read-in switch 22. The equalizing pulses in the H.D. signals from the selector 18 are removed by the equalizing pulse removing circuit 24 and the signals are supplied to the phase comparator 26. The output signals from the phase comparator 26 are supplied to the voltage control oscillating circuit 28 and divided to generate sampling clock pulses. The sampling clock pulses change frequencies of the sampling clock pulses so as to make desired oscillating pulse numbers (for example, 1024) of the sampling clock pulses in desired image area by the 1/N counter controlled by a microcomputer 33 and the output signals from the 1/N counter 32 are fed back to the phase comparator 26. The periods of the feedback signals from the 1/N counter 26 are synchronized with the periods of the H.D. signals and the output signals from the phase comparator 26 are output from the voltage control oscillating circuit 28 as the signals VFout via the low pass filter 27 to the A/D converter 16 and at the same time, the signals are supplied to the D/A converter 50.

The number of clock pulses in a scanning line of video signals is calculated as described in FIG. 4. According to FIG. 4, the period of image signals (H. Display Time) is 49.6 sec. and this corresponds to, for example, the clock pulse numbers of 1024. Accordingly, one clock pulse is 48.4ns (49.6µs/1024) and the number of clock pulses in one scanning line is calculated by the following equation:

$$63.5\mu s/48.4ns = 1312.$$

By putting 1312 in place of N in the equation (1), the following equation can be obtained:

$$1312(N) = 1024(A) + 288(B)$$

The output signals $A_{DD0}$–$A_{DD7}$ from the A/D converter are supplied to the serial parallel converter 17 and are sequentially memorized signals corresponding to one frame in accordance with the signals SRSEL0-SRSELF from the decoder 31. The data signals LS 374 on are supplied from the registor 19 at the timing slightly after signals DFCP are output from the decoder 31 and memorized in the frame memory 42. Either output signals B from an address counter 30 or signals A from an address counter 34 are selected by the signals SEL from the frame memory timing circuit 47 to address the data signals in the frame memory 42 and horizontal address and vertical address are switched by the selector 40. Thus, the video signals are memorized in the frame memory 42 by real time operation.

When image signals stored in the frame memory 42 by the aforementioned operation are output to display the images on display means such as a cathode ray tube, signals from the microcomputer 33 are supplied to the shift register 46 via the frame memory 42 and the output signals from the shift register 46 are converted by the D/A converter 50 into output video signals $S_{AO}$.

The scanning line numbers/frame of the output video signals $S_{AO}$ corresponds to those of display means such as a CRT display to be connected, by inputting H. D. and V. D. signals from the video generator corresponding to the scanning line numbers/frame of the output video signals $S_{AO}$, and therefore, clear and fine display images can be obtained regardless of the scanning line numbers/frame of the input video signals Si. In case image signals are stored in the frame memory 42 as digital signals, the digital signals $S_{DO}$ can be output via a data register 49 and a digital interface 51.

In this example, the N value of the 1/N counter is calculated by the equation: $N = A + B$, but the equation (2) can be used instead of the equation (1), if sampling clock signal periods of each scanning line in image signals sampled are determined at desired periods.

An example of the clock pulses of video signals calculated by use of the equation (2) is shown below:

$$[63.5\mu s/47.0ns] = 1351$$

where 47.0ns is the sampling clock pulse periods of input video signals of signal sources. By use of this method, aliasing or beat between input periods of image signals and sampling periods in the A/D converter 16 can be prevented and, deficiencies such as deformation of displayed images, and deformation of bits of periodical patterns, characters such as A or the like, for instance are not caused.

A second embodiment of the image storage device in accordance with the present invention will be hereinafter described with reference to FIG. 5.

Basic configuration of this embodiment is similar to the first embodiment and therefore, detailed explanation will be simplified.

Figure 5:
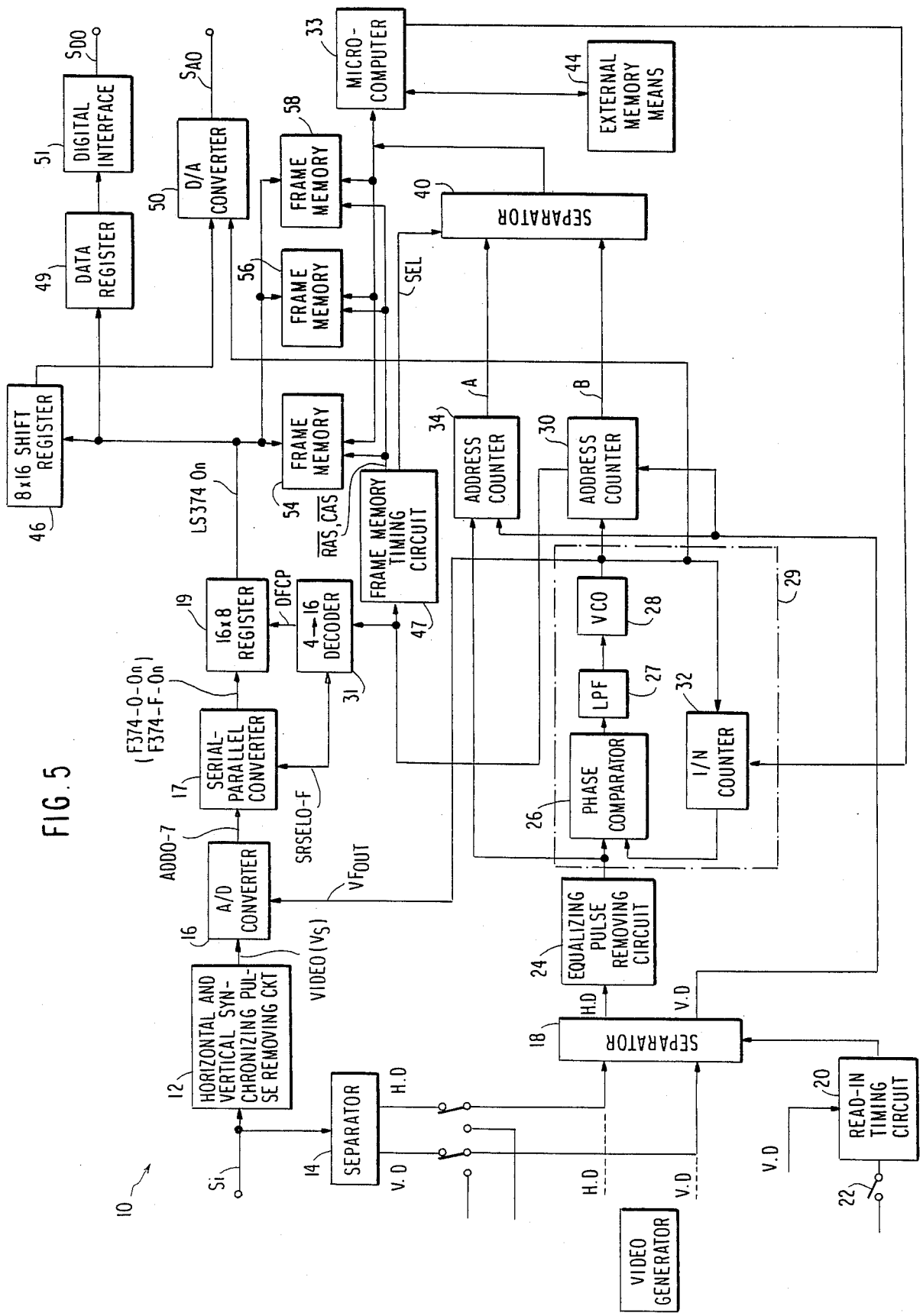
FIG. 5 is a block diagram of a video image storage device according to a second embodiment of the present invention.

As shown in FIG. 5, signals from the shift register 19 are supplied to frame memories 54, 56 and 58 respectively to which input control signals are supplied from a microcomputer 33. The image signals to be memorized into any of the frame memories 54, 56 and 58 are arbitrarily selected by the input control signals. The output signals from the frame memories 54, 56 and 58 are supplied to the shift register 46. The shift register 46 outputs analog signals $S_{AO}$ via an D/A converter 50. In case digital signals stored in the frame memories 54,56 and 58 are directly output, the digital signals $S_{DO}$ output via a data register 49 and a digital interface 51. According to this embodiment, the input image signals are memorized in any of the three frame memories 54, 56 and 58 in accordance with the control signals from the microcomputer 33.

In the course of the above process, the microcomputer 33 output the output control signals to any of the frame memories 54, 56 and 58 and image signals which have been stored in the remaining frame memories of the frame memories 54, 56 and 58 are output in accordance with the output control signals from the microcomputer 33 and thus, different image signals can be input and output simultaneously.

Accordingly, the device according to the present embodiment can memorize image signals having various scanning line numbers/frame simultaneously and separately, and can output to various types of devices, for instance, a laser printer or the like so as to meet the scanning lines of the output devices by changing the scanning line numbers/frame as required. Thus, the device according to the present embodiment can be used for an image signal buffer.

Figure 6A:
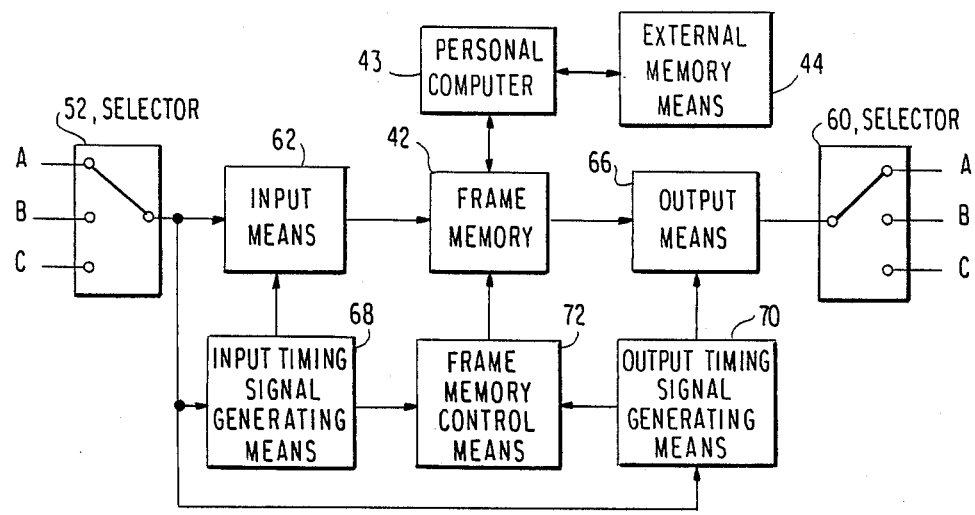
FIG. 6A is a block diagram of a video image storage device according to the present invention.

The following example is an application of the first embodiment to the device of the present invention. The example will be described referring to FIG. 6A.

Input signals Si having different scanning line numbers A, B or C are input to a selector 52 and output signals of the selector 52 are input to an input timing signal generating means 68 and an input means 62. The output signals from the selector 52 are memorized in a frame memory 42 via the input means 62 after the signals are A/D converted by the input means 62 in accordance with the timing signals generated by the input timing signal generating means 68. In a similar manner, an output means 66 is controlled by an output signal timing generating means 70. In case the output means 66 comprises a D/A converter and the output signals therefrom are analog signals, stationary images can be viewed by an output device via a selector 60 by real time operation. In another way, image signals stored in an external memory means 44 such as a floppy disk through a personal computer 43 are transferred to the frame memory 42 in accordance with output timing signals by use of input signals generated by output signals of a video generator as described in the first embodiment of the present invention. In this way, the contents of the floppy disk are output and diagnostic image can be viewed at a place located in a far distance from a diagnostic apparatus. The images can be used for the purpose of image evaluation. Further, the output signals from the video generator can be the same as input signals.

Figure 6B:
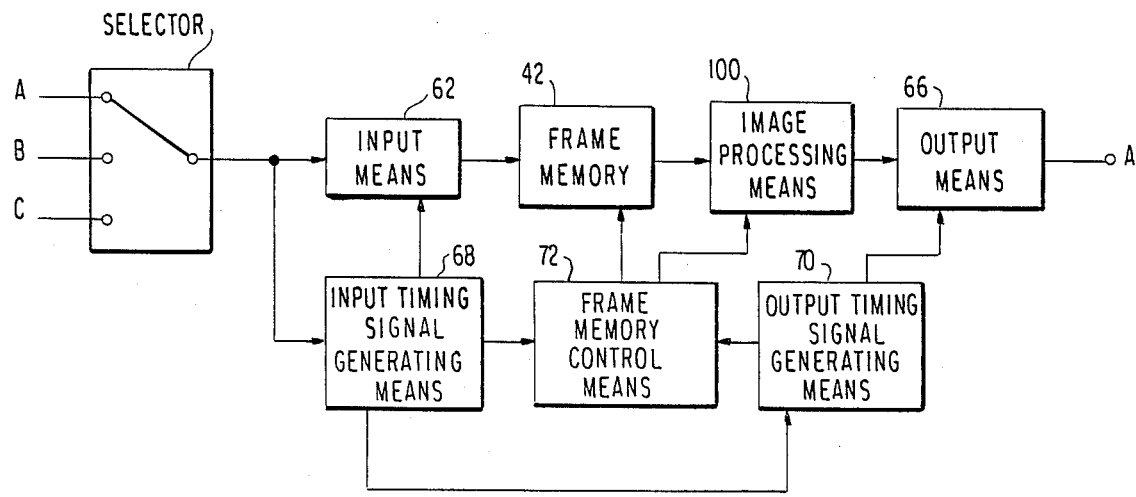
FIG. 6B is a block diagram of a video image storage device having an image processing means according to the present invention.

The following example is a second application of the first embodiment of the present invention. As shown in FIG. 6B, an image processing means 100 is present between a frame memory 42 and a signal output means 66. Signals from a frame memory control means 72 are supplied to the image processing means 100 and the frame memory 42. In the image processing means 100, image information obtained by adding raster lines or reducing raster lines between original scanning lines in the vertical direction by the use of known manner, is output at an output timing by the signals from a output timing signal generating means 70 and images having a predetermined format can be obtained.

When the output signals are output to a medical laser printer, normalization to a predetermined format in the vertical direction do not necessiate rate control of sub-scanning of the scanner of the laser printer and the aspect ratio of the output images can be easily determined in this instance.

In simple PACS (picture archiving and communication system), a cathode ray tube (CRT) having predetermined scanning line numbers can be used by the application of the technique of the present example.

Further, in case of outputting the output signals to a CRT imaging camera (a video screen image recording camera) which can take multi-format photographs, it is possible to display images on the CRT screen having a predetermined scanning line number and to photograph images of various types of diagnostic modalities on a single film with desired layout.

Figure 7:
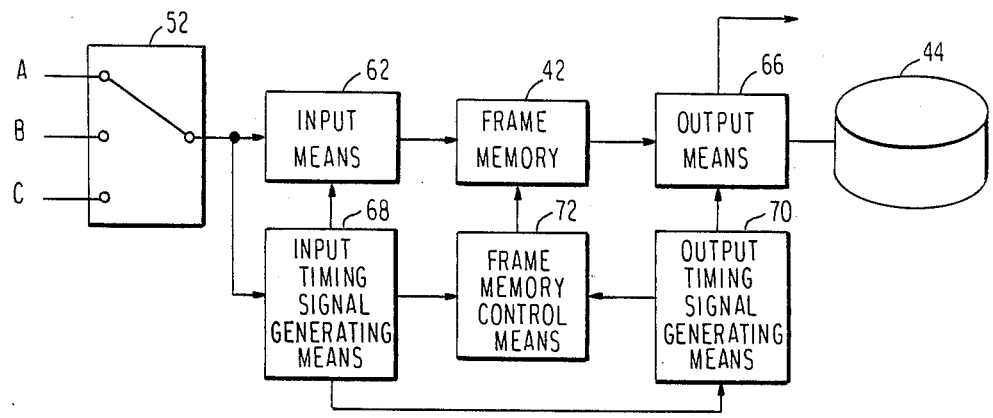
FIG. 7 is a block diagram of a video image storage device having an external memory means connected to the output means thereof according to an embodiment of the present invention.

The following example is an application of the first embodiment of the present invention to a system for collecting images. FIG. 7 shows a block diagram where image signals stored in a frame memory 42 are output through an output means 66 to an external memory means 44 such as magnetic disks, floppy disks in a microcomputer or the like.

The signals stored in the external memory means 44 mentioned in the above, can be output in the following manner.

In case the signals are output to a medical laser printer, input signals from various types of diagnostic modalities through a digital signal interface are input to the device of the present invention. The medical laser printer is generally provided with an image memory means, an image processing means, a laser beam source, light modulation means, light scanning means and recording medium transporting means. In a conventional manner, output signals which have been image-processed so as to meet each diagnostic purpose are output to the laser printer. Accordingly, in such conventional way, diagnostic modal apparatus and both hardware and software of the laser printer will cause higher production cost. In such instance, the image storage device according to the present invention can apply to every kind of diagnostic modalities at low cost without any modifications or changes of the conventional signal output devices.

The PACS (picture archiving and communication system) has been developed under such circumstances that various types of novel digital image diagnostic system have been rapidly introduced into market, performance of image processing systems has been improved and that high speed image readout devices at low cost have been developed. The PACS is a sort of consolidated system for imaging and information storage and retrieval. Medical imaging devices which have different formats depending upon the devices made by manufacturers will become compatible with one another by the use of the image storage devices according to the present invention and therefore, it is possible to constitute the PACS as mentioned in the above by use of conventional medical diagnostic apparatus.

The image storage devices according to the present invention can be used as a medical image collecting system and can retrieve images from the device when required.

The following example is an application of the second embodiment of the present invention in which a plurality of frame memories is used.

Figure 8:
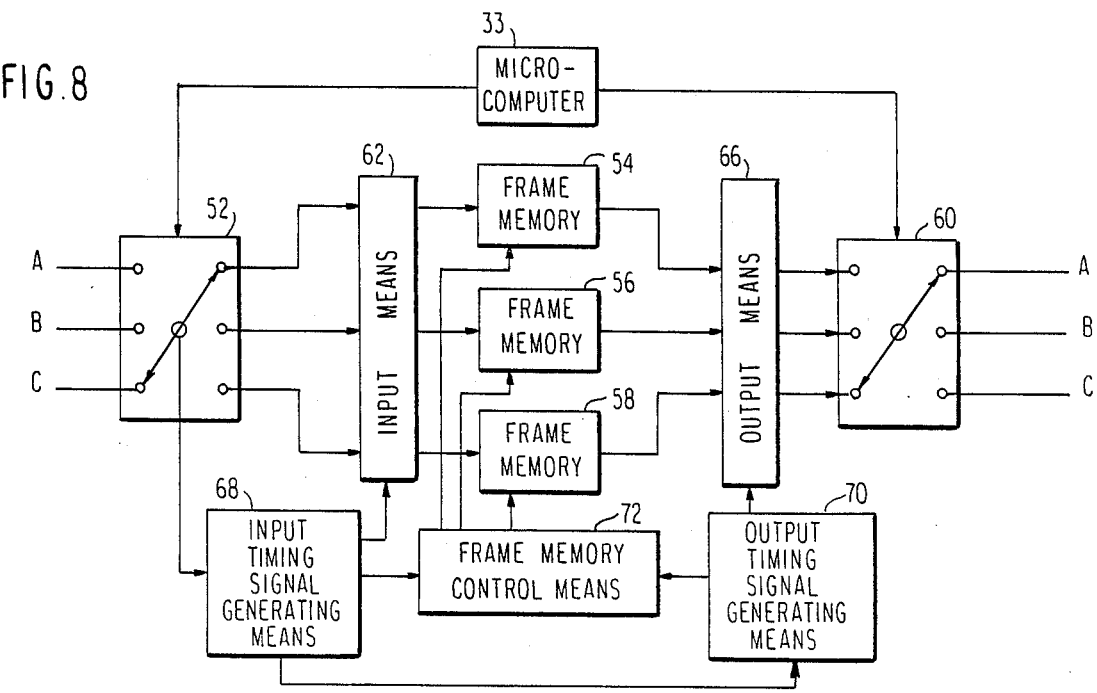
FIG. 8 is a block diagram of a video image storage device having a plurality of frame memory means.

As shown in FIG. 8, a selector 52 is equipped with three input terminals and three output terminals respectively. Each input terminal receives input signals having different scanning line numbers respectively and the output image signals therefrom can be memorized in any of the three frame memories 54, 56 and 58 through an input means 62. In the course of memorizing the signals in any of the frame memories 54, 56, 58, remaining frame memories which are not memorizing the signals, can output image signals which have already been memorized therein to an output means 66 which is selectable by means of a selector 60. The system constituted according to the above mentioned, can be used for an image buffer which will be described in detail below.

Images obtained from a plurality of diagnostic apparatus, for example, a CT, a MR1, a US, cannot simultaneously be recorded on film by use of one unit of a CRT imaging camera if these apparatus output concurrently diagnostic image signals. The diagnostic image signals can be temporarily stored in the frame memories by the application of the present example and it is also possible to record various images edited in preferred formats on a single film sheet by the use of this system. More particularly, diagnostic images of blood vessels can be memorized in the frame memories according to the present example, and a part of the images can be recorded on film or can be displayed on a CRT screen in desired formats in case of necessity of surgical operation. Further, when the esophagus is looked at through the fluoroscope, the images thereof can be stored in the frame memories at real time and a hard copy of the image of affected part can be obtained by using this system, if necessary. In addition, the present system can be used, as an image buffer, for an input terminal of data communication inside and outside hospital.

What is claimed is:

1. A video image storage device, comprising: an image signal input means converting image signals in input video signals having various types of scanning lines into digital image signals by analog-to-digital conversion;
   a frame memory means memorizing the converted image signals;
   a signal output means outputting the memorized image signals in the form of digital signals when required;
   an input timing signal generating means which generates sampling clock signals synchronized with horizontal synchronizing pulses of the input video signals;
   an output timing signal generating means which causes the frame memory means to output the memorized image signals; and
   a frame memory control means which controls signal memory function of the image signals from the signal input means to the frame memory means in accordance with signals from the input timing signal generating means and controls signal output function of the image signals from the frame memory means to the signal output means in accordance with signals from the output timing signal generating means.

2. A video image storage device according to claim 1, wherein the signal output means is connected to an external memory means.

3. A video image storage device comprising:
   an image signal input means converting image signals in input video signals which may have any one of various types of scanning lines into digital image signals by analog-to-digital conversion;
   a frame memory means memorizing the converted image signals;
   a signal output means outputting the memorized image signals in the form of analog signals in the frame memory means by digital-to-analog conversion when required;
   an input timing signal generating means which generates sampling clock signals synchronized with horizontal synchronizing pulses of the input video signals;
   an output timing signal generating means which causes the frame memory means to output the memorized image signals; and
   a frame memory control means which controls signals memory function of the image signals from the signal input means to the frame memory means in accordance with signals from the input timing signal generating means and controls signal output function of the image signals from the frame memory means to the signal output means in accordance with signals from the output timing signal generating means,
   wherein the frame memory means consists of a plurality of frame memories; and any of the frame memories are outputting image signals which have been memorized while the remaining frame memories are performing memorizing function of image signals.

4. A video image storage device according to claim 1, wherein the frame memory means consists of a plurality of frame memories; and
   any of the frame memories are outputting image signals which have been memorized while the remaining frame memories are performing memorizing function of image signals.

5. A video image storage device according to claim 1, wherein the input timing generating means comprises:
   an N-multiplying circuit including an oscillator which generates N-multilpied sampling clock signals of the horizontal synchronizing pulses of the input video signals;
   a low pass filter which passes signals of lower frequencies than predetermined frequencies; and
   a phase comparator synchronizing with the phase of the horizontal synchronizing pulses by comparison with the horizontal synchronizing pulses by dividing the sampling clock pulses output from the oscillator by means of a dividing circuit;
   wherein the basic system clock signals are arbitrarily determined by the N value of the dividing circuit based upon the relation between effective image period and blanking period.

6. A video image storage device comprising:
   an image signal input means converting image signals in input video signals which may have any one of various types of scanning lines into digital image signals by analog-to-digital conversions;
   a frame memory means memorizing the converted image signals;

a signal output means outputting the memorized image signals in the form of analog signals in the frame memory means by digital-to-analog conversion when required;

an input timing signal generating means which generates sampling clock signals synchronized with horizontal synchronizing pulses of the input video signals;

an output timing signal generating means which causes the frame memory means to output the memorized image signals; and a frame memory control means which controls signal memory function of the image signals from the signal input means to the frame memory means in accordance with signals from the input timing signal generating means and controls signal output function of the image signals from the frame memory means to the signal output means in accordance with signals from the output timing signal generating means, wherein the input timing signal generating means comprises:

an N-multiplying circuit including an oscillator generating N-multiplied sampling clock signals of the horizontal synchronizing pulses of the input video signals;

a low pass filter which passes signals of lower frequencies than predetermined frequencies; and a phase comparator synchronizing with the phase of the horizontal synchronizing pulses by comparison with the horizontal synchronizing pulses by dividing the sampling clock pulses output from the oscillator by means of a dividing circuit;

wherein the N value of the dividing circuit is determined by dividing the periods of horizontal synchronizing pulses of input video signals by the oscillating frequency of the sampling clock pulses of input video signals from signal sources so that the periods of basic system clock signals is optimized by the N value.

7. A video image storing device according to claim 1, wherein the input timing signal generating means comprises:

an N-multiplying circuit including an oscillator generating N-multiplied sampling clock signals of the horizontal synchronizing pulses of the input video signals;

a low pass filter which passes signals of lower frequencies than predetermined frequencies; and a phase comparator synchronizing with the phase of the horizontal synchronizing pulses by comparison with the horizontal synchronizing pulses by dividing the sampling clock pulses output from the oscillator by means of a dividing circuit;

wherein the N value of the dividing circuit is determined by dividing the periods of the horizontal synchronizing pulses of input video signals by the oscillating frequency of the sampling clock pulses of input video signals from signal sources so that the periods of basic system clock signals is optimized by the N value.

8. A video image storage device comprising:

an image signal input means converting image signals in input video signals which may have any one of various types of scanning lines into digital image signals by analog-to-digital conversion;

a frame memory means memorizing the converted image signals;

a signal output means outputting the memorized image signals in the form of analog signals in the frame memory means by digital-to-analog conversion when required;

an input timing signal generating means which generates sampling clock signals synchronized with horizontal synchronizing pulses of the input video signals;

an output timing signal generating means which causes the frame memory means to output the memorized image signals; and a frame memory control means which controls signal memory function of the image signals from the signal input means to the frame memory means in accordance with signals from the input timing signal generating means and controls signal output function of the image signals from the frame memory means to the signal output means in accordance with signals from the output timing signal generating means, wherein the various types of scanning lines of various video signals include:

different scanning line numbers/frame;

scanning lines containing equalizing pulses;

scanning lines without equalizing pulses;

interlace scanning; non-interlace scanning; and scanning lines having different image area in a horizontal scanning line.

9. A video image storage device comprising:

an image signal input means converting image signals in input video signals which may have any one of various types of scanning lines into digital image signals by analog-to-digital conversion;

a frame memory means memorizing the converted image signals;

a signal output means outputting the memorized image signals in the form of digital signals when required;

an input timing signal generating means which generates sampling clock signals synchronized with horizontal synchronizing pulses of the input video signals;

an output timing signal generating means which causes the frame memory means to output the memorized image signals; and a frame memory control means which controls signal memory function of the image signals from the signal input means to the frame memory means in accordance with signals from the input timing signal generating means and controls signal output function of the image signals from the frame memory means to the signal output means in accordance with signals from the output timing signal generating means, wherein the various types of scanning lines include: different scanning line numbers/frame; scanning lines containing equalizing pulses; scanning lines without equalizing pulses; interlace scanning; non-interlace scanning; and scanning lines having different image area in a horizontal scanning line.

10. A video image storage device comprising:

an image signal input means converting image signals in input video signals which may have any one of various types of scanning lines into digital image signals by analog-to-digital conversion;

a frame memory means memorizing the converted image signals;

a signal output means outputting the memorized image signals in the form of analog signals in the frame memory means by digital-to-analog conversion when required;

an input timing signal generating means which generates sampling clock signals synchronized with horizontal synchronizing pulses of the input video signals;

an output timing signal generating means which causes the frame memory means to output the memorized image signals; and a frame memory control means which controls signal memory function of the image signals from the signal input means to the frame memory means in accordance with signals from the input timing signal generating means and controls signal output function of the image signals from the frame memory mean to the signal output means in accordance with signals from the output timing signal generating means, wherein the signal output means outputs signals to any of:
a laser printer;
an ink printer;
a thermal printer;
a video screen image recording camera;
an X-ray television unit; and
an image display unit for signal transmission in a hospital.

11. A video image storage device according to claim 1, wherein the signal output means outputs signals to any of
a laser printer;
an ink jet printer;
a thermal printer;
a video screen image recording camera,
an X-ray television unit; and
an image display unit for signal transmission in a hospital.

12. A video image storage device according to claim 6 or 7, wherein the N value is calculated by the following equation;

$$N = [Th/Ts]$$

where brackets are Gaus symbols to make N an integer, N is sampling clock pulse numbers in one horizontal scanning line, Th is oscillating periods of horizontal synchronizing pulses and TS is pulse periods of sampling clock signals.

13. A video image storage device, comprising:
an image signal input means converting image signals in input video signals which may have any one of various types of scanning lines into digital image signals by analog-to-digital conversion;
a frame memory means memorizing the converted image signals;
a signal output means outputting the memorized image signals in the form of analog signals in the frame memory means by digital-to-analog conversion when required;
an input timing signal generating means which generates sampling clock signals synchronized with horizontal synchronizing pulses of the input video signals;
an output timing signal generating means which causes the frame memory means to output the memorized image signals; and a frame memory control means which controls signal memory function of the image signals from the signal input means to the frame memory means in accordance with signals from the input timing signal generating means and controls signal output function of the image signals from the frame memory means to the signal output means in accordance with signals from the output timing signal generating means.

wherein the input timing generating means comprises:
an N-multiplying circuit including an oscillator which generates N-multiplied sampling clock signals of the horizontal synchronizing pulses of the input video signals;
a low pass filter which passes signals of lower frequencies than predetermined frequencies; and
a phase comparator synchronizing with the phase of the horizontal synchronizing pulses by comparison with the horizontal synchronizing pulses by dividing the sampling clock pulses output from the oscillator by means of a dividing circuit;
wherein the basic system clock signals are arbitrarily determined by the N value of the dividing circuit based upon the relation between effective image period and blanking period;
wherein the N value is calculated by the following equation:

$$N = A + B$$

wherein N is sampling clock pulse numbers in one horizontal scanning line, A is clock pulse numbers in desired image area and B is clock pulse numbers in non-image area.

14. A video storage device, comprising:
an image signal input means converting image signals in input video signals which may have any one of various types of scanning lines into digital image signals by analog-to-digital conversion;
a frame memory means memorizing the converted image signals;
a signal output means outputting the memorized image signals in the form of digital signals when required;
an input timing signal generating means which generates sampling clock signals synchronized with horizontal synchronizing pulses of the input video signals;
an output timing signal generating means which causes the frame memory means to output the memorized image signals; and
a frame memory control means which controls a signal memory function of the image signals from the signal input means to the frame memory means in accordance with signals from the input timing signal generating means and controls signal output function of the image signals from the frame memory means to the signal output means in accordance with signals from the output timing signal generating means;
wherein the input timing generating means comprises:
an N-multiplying circuit including an oscillator which generates N-multiplied sampling clock signals of the horizontal synchronizing pulses of the input video signals;

a low pass filter which passes signals of lower frequencies than predetermined frequencies; and a phase comparator synchronizing with the phase of the horizontal synchronizing pulses by comparison with the horizontal synchronizing pulses by dividing the sampling clock pulses output from the oscillator by means of a dividing circuit;

wherein the basic system clock signals are arbitrarily determined by the N value of the dividing circuit based upon the relation between effective image period and blanking period;

wherein the N value is calculated by the following equation:

$$N = A + B$$

wherein N is sampling clock pulse numbers in one horizontal scanning line, A is clock pulse numbers in desired image area and B is clock pulse numbers in non-image area.

* * * * *